United States Patent [19]
Abel et al.

[11] 3,968,312
[45] July 6, 1976

[54] COATING FIBROUS SUBSTRATES

[75] Inventors: Heinz Abel, Reinach; Melvin Harris, Dornach, both of Switzerland; Derek James Rowland Massy, Linton, England

[73] Assignee: Ciba-Geigy Corporation, Ardsley, N.Y.

[22] Filed: Aug. 30, 1973

[21] Appl. No.: 392,920

[30] Foreign Application Priority Data

Sept. 1, 1972 United Kingdom .............. 40648/72

[52] U.S. Cl. ................................ 428/419; 428/473; 427/389

[51] Int. Cl.$^{2}$ ...................... B32B 27/06; B32B 9/02; B05D 3/00

[58] Field of Search ..................... 117/142, 161 UC; 260/79.5 NV; 427/384, 390, 389; 428/419, 473

[56] References Cited

UNITED STATES PATENTS

| | | | |
|---|---|---|---|
| 2,466,963 | 4/1949 | Patrick et al. | 117/142 X |
| 2,721,145 | 10/1955 | Cheronis | 117/142 X |
| 2,877,197 | 3/1959 | Fisher | 117/140 X |
| 3,198,661 | 8/1965 | Johnson | 117/142 |
| 3,499,864 | 3/1970 | Millen | 117/142 X |
| 3,635,880 | 1/1972 | Lamboy et al. | 117/142 X |
| 3,676,195 | 7/1972 | Kehr et al. | 117/140 X |
| 3,676,283 | 7/1972 | Kehr et al. | 161/8 |
| 3,703,352 | 11/1972 | Dobinson et al. | 8/126 A |
| 3,706,527 | 12/1972 | Dobinson et al. | 8/127.5 |
| 3,714,290 | 1/1973 | Kehr et al. | 260/79.5 X |

*Primary Examiner*—Cameron K. Weiffenbach
*Assistant Examiner*—R. Eugene Varndell, Jr.
*Attorney, Agent, or Firm*—Joseph G. Kolodny; Edward McC. Roberts; Prabodh I. Almaula

[57] ABSTRACT

Leather is coated on at least one face with a curable composition comprising i. a polymercaptan containing at least two mercaptan groups per average molecule, ii. a polyene having, per average molecule, at least two ethylenic double bonds, each $\beta$ to an atom of nitrogen, sulfur, or oxygen, the sum of the mercaptan groups in the polymercaptan and of such ethylenic double bonds in the polyene being more than 4, and the composition is then cured on the leather with or without the application of heat, optionally in the presence of a Brønsted acid, a Brønsted base, or a source of free radicals, as a curing accelerator.

In this manner the leather is provided with a wearing or decorative surface having high gloss and smoothness, enhanced ease of cleaning, and decreased permeability to liquids.

15 Claims, No Drawings

COATING FIBROUS SUBSTRATES

This invention relates to processes for coating fibrous substrates and to fibrous substrates coated by such processes. In particular, it relates to processes for dressing leather and to leather so dressed.

We have found that desirable properties may be imparted to leather by coating it with a curable composition comprising certain polyenes and polymercaptans and curing the said composition. These desirable properties include decorative effects such as high gloss and smoothness, and also ease of cleaning and decreased permeability to liquids.

One aspect of this invention therefore comprises a process for providing leather, especially tanned leather, with a wearing or decorative surface which consists of 1. coating the leather on at least one face with a curable composition comprising
   - i. a polymercaptan containing, per average molecule, at least two mercaptan groups,
   - ii. a polyene having, per average molecule, at least two ethylenic double bonds each $\beta$ to an atom of nitrogen, sulphur, or oxygen, the sum of the mercaptan groups in the said polymercaptan and of such ethylenic double bonds in the said polyene being more than 4, and preferably from 5 to 8, and
2. curing the composition on the leather.

Ordinarily, the polyene and the polymercaptan are applied as a mixture, but it is within the scope of the invention to dress the leather with the polyene and the polymercaptan in either sequence and form the composition in situ. "Curing" includes "allowing to cure".

A wide range of polymercaptans is suitable for use as component (i) in the composition of this invention.

One class, which is preferred because of the ready availability of many of its members, comprises esters of monomercaptancarboxylic acids with polyhydric alcohols and of monomercaptanmonohydric alcohols with polycarboxylic acids.

Further preferred such esters are of the formula

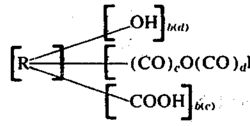

I where

R represents an aliphatic or araliphatic hydrocarbon radical of at least 2 and at most 60 carbon atoms, which may contain not more than one ether oxygen atom, $R^1$ represents a hydrocarbon radical, which may contain not more than one carbonyloxy group, and is preferably of from 1 to 4 carbon atoms, $a$ is an integer of from 2 to 6, $b$ is zero or a positive integer of at most 3, such that $(a + b)$ is at most 6, and $c$ and $d$ each represent zero or 1, but are not the same.

Yet further preferred among the polymercaptans of formula I are those which are also of the formula $$R^2(OCOR^3SH)_a \qquad II$$

where $a$ has the meaning previously assigned, $R^2$ is an aliphatic hydrocarbon radical of from 2 to 10 carbon atoms, and $R^3$ denotes $-CH_2-$; $-(CH_2)_2-$; or

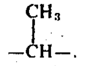

These esters are described in United Kingdom Pat. No. 1316416.

Also preferred are mercaptan-containing polyesters, including esters of monomercaptandicarboxylic acids, of formula $$R^6{+}(O)_g CO(O)_h R^4(O)_h CO(O)_g R^5SH)_f \qquad III$$

where $f$ is an integer of from 1 to 6, $g$ and $h$ are each zero or 1 but are not the same, $R^4$ represents a divalent organic radical, linked through a carbon atom or carbon atoms thereof to the indicated —O—or —CO— units, $R^5$ represents a divalent organic radical, linked through a carbon atom or carbon atoms thereof to the indicated —SH group and —O— or —CO— units, and $R^6$ represents an organic radical, which must contain at least one —SH group when $f$ is 1, linked through a carbon atom or carbon atoms thereof to the indicated —O— or —CO— units.

Preferably, when $g$ is zero, $R^4$ denotes a saturated aliphatic hydrocarbon chain of 2 to 250 carbon atoms, which may be substituted by methyl groups and by —SH groups and which may be interrupted by ether oxygen atoms and by carbonyloxy groups; when $g$ is 1, $R^4$ preferably denotes a. a saturated aliphatic hydrocarbon group of 2 to 10 carbon atoms which may bear an —SH group, b. a cycloaliphatic-aliphatic hydrocarbon group of 5 to 34 carbon atoms, which may contain ethylenic unsaturation, or c. a mononuclear arylene hydrocarbon group of 6 to 12 carbon atoms. When $g$ is zero, $R^5$ preferably denotes a saturated aliphatic hydrocarbon group of 1 to 3 carbon atoms, which may bear a carboxyl group, and, when $g$ is 1, a saturated aliphatic hydrocarbon group of 2 to 4 carbon atoms which may be substituted by a hydroxyl group or by a chlorine atom, $R^6$ preferably denotes a. an aliphatic or cycloaliphatic-aliphatic hydrocarbon group of 2 to 51 carbon atoms, which may bear at least one —SH group, b. a mononuclear or dinuclear arylene hydrocarbon group of 6 to 15 carbon atoms, c. a chain of 4 to 250 carbon atoms, interrupted by at least one ether oxygen atom and optionally substituted by at least one —SH group, or d. a chain of 6 to 750 carbon atoms, interrupted by at least one carbonyloxy group, optionally interrupted by at least one ether oxygen atom and optionally substituted by at least one —SH group.

These esters are described in United Kingdom Pat. Nos. 1311090 and 1315820.

Also suitable are esters and ethers which are of the general formula

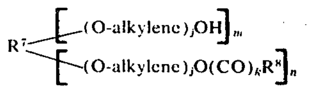 IV where each "alkylene" group cotains a chain of at least 2 and at most 6 carbon atoms between consecutive oxygen atoms,

*j* is a positive integer such that the average molecular weight of the polymercaptan is at least 400, but preferably not more than 10000,

*k* is zero or 1,

*m* is zero or a positive integer such that $(m + n)$ is at most 6,

*n*is an integer of from 2 to 6, $R^7$ represents the radical of a polyhydric alcohol after removal of $(m + n)$ alcoholic hydroxy groups, and $R^8$ represents an aliphatic radical containing at least one mercaptan group.

"Alkylene" units in individual poly(oxyalkylene) chains may be the same or different and they may be substituted by e.g., phenyl or chloromethyl groups. Preferably they are $-C_2H_4-$ or $-C_3H_6-$ groups.

Preferred amongst the compounds of formula IV are the esters of formula

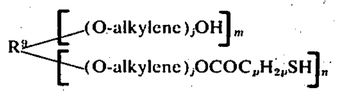 V and the ethers of formula

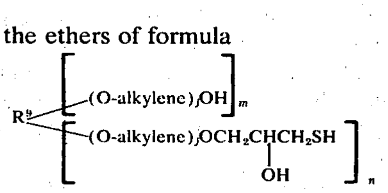 VI where alkylene and *j*, *m*, and *n* have the meanings previously assigned, $R^9$ represents an aliphatic hydrocarbon radical of from 2 to 6 carbon atoms, and

*p* is 1 or 2.

These esters and ethers are described in United Kingdom Pat. No. 1278934.

Yet other suitable polymercaptans are mercaptan-terminated polysulphides of the general formula

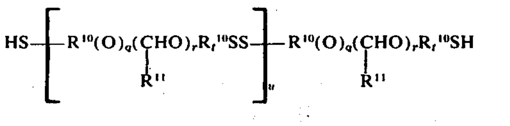 VII where each $R^{10}$ denotes an alkylene hydrocarbon group containing from 2 to 4 carbon atoms, $R^{11}$ denotes $-H$, $-CH_3$, or $-C_2H_5$,

*u* is an integer which has an average value of at least 1, and is preferably such that the average molecular weight of the polysulphide is at most 10000, and either *q* is zero, in which case *r*and *t* are each also zero, or *q* is 1, in which case *r* is zero or 1 and *t* is 1.

The preferred polysulphides are those of formula VII where $R^{11}$ denotes hydrogen and *q* and *r* are each 1, *u* being such that the molecular weight of the polysulphide is from 500 to 8000.

These polysulphides are described in, inter alia, United Kingdom Pat. No. 1316579.

Another class of polymercaptans comprises mercaptan-terminated poly(butadienes) of the formula

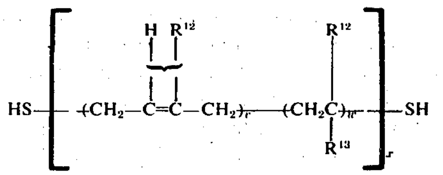 VIII where each $R^{12}$ represents $-H$ or $-CH_3$, $R^{13}$ represents $-CN$, $-COOH$, $-CONH_2$, $-COOR^{14}$, $-C_6H_5$, or $-OCOR^{14}$, where $R^{14}$ is an alkyl group of one to eight carbon atoms,

*v* is an integer of at least one,

*w* is zero or a positive integer, and

*x* is an integer such that the average number molecular weight of the polymercaptan is at least 500, but preferably not more than 10000.

Preferably the polymercaptans of formula VIII are also of the formula

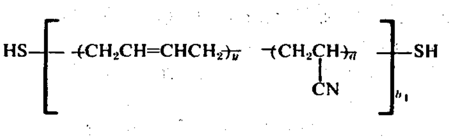 IX where $a_1$ is either zero, in which case *y* is 1, or it is 1, in which case *y* is an integer of from 2 to 5, and $b_1$ is an integer such that the average molecular weight of the polymercaptan is at least 1250 and at most 5000.

Also suitable are the polymercaptans of the formula

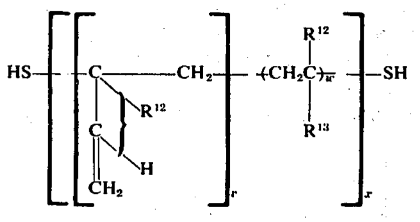 X and particularly those of the formula

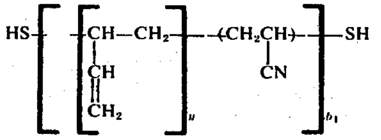 XI where $R^{12}$, $R^{13}$, *v*, *w*, *x*, *y*, $a_1$, and *b* have the meanings previously assigned.

These polymercaptans are described in United Kingdom Pat. No. 1315124.

Yet another suitable class of polymercaptans comprises the mercaptanterminated polyoxyalkylenes of the general formula

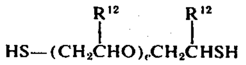 XII where each $R^{12}$ has the meaning previously assigned and *e* is an integer of from 1 to 4.

As already indicated, the polyenes employed contain at least two ethylenic double bonds, each $\beta$ to an atom of oxygen, nitrogen, or sulphur; these heteroatoms, which are for preference oxygen, may be the same or different.

Polyenes preferred for the purposes of this invention have average molecular weights in the range 250 to 10000, and further preferred are those having at least two ethylenic double bonds each $\alpha$ to a carbonyloxy group, particularly those of the formula $$R^{15}\left[(\text{O-alkylene})_{d_1}-O-(CH_2\underset{\displaystyle R^{16}}{\underset{|}{C}}HCH_2O)_{e_1}-R^{17}\right]_{c_1} \qquad \text{XIII}$$

where $d_1$ is zero or a positive integer of value such that the average molecular weight of the polyene does not exceed 10000, $e_1$ is zero or 1, $c_1$ is an integer of at least 1, but generally at most 6, and is preferably 2 or 3, $R^{15}$ denotes the radical, preferably containing not more than 60 carbon atoms, remaining after removal of $c_1$ OH groups from a compound having at least $c_1$ alcoholic or phenolic hydroxyl groups or the acyl radical remaining after removal of $c_1$OH groups from a compound having at least $c_1$ COOH groups, alkylene has the meaning previously assigned, $R^{16}$ represents a group of formula —OH or —$OOCR^{18}$, where $R^{18}$ represents —H or a monovalent hydrocarbon group, preferably of not more than 10 carbon atoms, which may bear carboxyl or alkoxycarbonyl substituents, $R^{17}$ represents —H, a monovalent acyl group, preferably containing not more than 10 carbon atoms, or the residue, after removal of an —OH group, of an alcohol, with the provisos that $R^{15}$ and $R^{17}$ do not both represent acyl if $d_1$ and $e_1$ both denote zero and that $R^{17}$ does not represent —H if $e_1$ is 1, there being a total of at least two ethylenic double bonds $\alpha$ to carbonyloxy groups in the group $R^{15}$, and/or in the $c_1$ groups $R^{17}$, and/or in the $e_1$ $c_1$ groups $R^{18}$ if present.

Yet further preferred are polyenes of formula XIII in which $R^{17}$ represents the monacyl residue of a saturated or ethylenically unsaturated mono- or di-carboxylic acid, and particularly a gruop of formula $$-CO-\underset{\displaystyle R^{20}}{\underset{|}{C}}=CHR^{19} \qquad \text{XIV}$$

where $R^{20}$ denotes —H, —Cl, —Br, or an alkyl group of 1 to 4 carbon atoms, and $R^{19}$ denotes —H, —COOH, or a group of the formula $$-COO(CH_2\underset{\displaystyle R^{16}}{\underset{|}{C}}HCH_2O)_{e_1}-R^{21} \qquad \text{XV}$$

where $R^{16}$ and $e_1$ have the meanings previously assigned and $R^{21}$ denotes —H, an alkyl, aryl, aralkyl, or alkenyl hydrocarbon group or an aliphatic, aromatic, or araliphatic acyl group, such that the group $R^{19}$ contains not more than 24 carbon atoms.

$R^{18}$ preferably represents a group containing from 2 to 16 carbon atoms and bearing either one —COOH group or one alkoxycarbonyl group containing from 1 to 13 carbon atoms, and especially it denotes —CH = CHCOOH or —$CH_2CH_2COOH$.

$R^{15}$ preferably represents an aliphatic radical containing from 3 to 60 carbon atoms, especially a saturated hydrocarbon radical of not more than 6 carbon atoms, or a radical of the formula

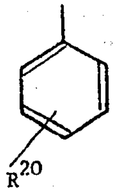
XVI

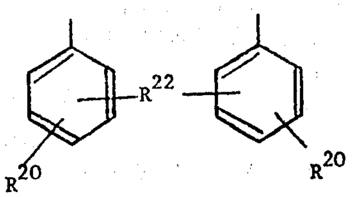
XVII

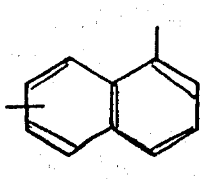
XVIII or

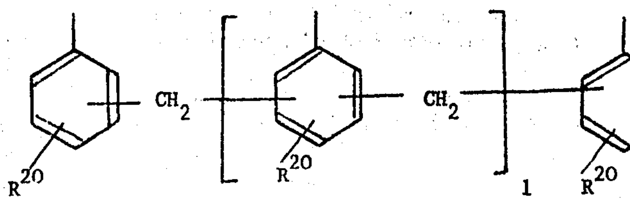
XIX where each $R^{20}$ has the meaning previously assigned, $R^{22}$ denotes a carbon-carbon bond, an alkylene hydrocarbon group of from 1 to 4 carbon atoms, or an ether oxygen atom, and $e$ has the meaning previously assigned.

Compounds of formula XI, where $R^{15}$ is the radical remaining after removal of $c_1$ OH groups from an alcohol containing at least $c_1$ alcoholic hydroxyl groups or, providing $d_1$ is at least one, the acyl radical remaining after removal of $c_1$ OH groups from a carboxylic acid containing at least $c_1$ carboxylic acid groups or the aryl radical remaining after removal of $c_1$ OH groups from a phenol containing at least $c_1$ phenolic hydroxyl groups, are obtainable by esterifying the alcohol of formula $R^{15}[(O=alkylene)_{d}OH]_{c_1}$ XX with a carboxylic acid of formula $HOR^{17}$ or its anhydride or acid chloride, in the case where $e_1$ is zero, while those where $e_1$ is 1 are obtainable by converting the alcohol of formula XX into its glycidyl ether of formula

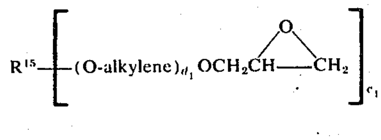

XXI followed by opening of the indicated epoxide ring through reaction with the carboxylic acid of formula $HOR^{17}$.

Compounds of formula$^{XIII}$, where $R^{15}$ is the acyl radical remaining after removal of $c_1$ OH groups from a carboxylic acid containing at least $c_1$ carboxylic acid groups and $d_1$ is zero, are obtainable by esterification of the carboxylic acid of formula $R^{15}$ $(OH)_{c_1}$ or its anhydride with an alcohol of formula $R^{17}$ OH, where $e_1$ is zero, while those where $e_1$ is 1 are obtainable by reaction of the acid $R^{15}$ $(OH)_{c_1}$ with a glycidyl ether or a glycidyl ester.

Compounds of formula XIII, where $R^{15}$ is the aryl radical remaining after removal of $c_1$ OH groups from a compound having at least $c_1$ phenolic hydroxyl groups and $d_1$ and $e_1$ are each zero, are obtainable by esterifying the phenol of formula $R^{15}\ (OH)_{c_1}$ XXII with a carboxylic acid of formula $HOR^{17}$ or its anhydride or acid chloride, while those where $d_1$ is zero and $e_1$ is 1 are obtainable by converting the phenol of formula XXII into its glycidyl ether of formula

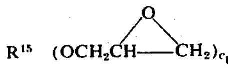

XXIII followed by opening of the indicated ring through reaction with the carboxylic acid of formula $HOR^{17}$, or by reaction of the phenol XXII with the appropriate glycidyl ether or ester.

Usually, the polymercaptan is employed in a quantity sufficient to supply from 0.8 to 1.1 mercaptan groups per said ethylenic double bonds of the polyene: the optimum amounts, and the relative proportion of the polymercaptan and the polyene required for satisfactory curing, may readily be ascertained by simple experiment.

Desirably, the polymercaptan contains up to 6 mercaptan groups per average molecule and at least one of the polyene and the polymercaptan has an average molecular weight in the range 1000 to 6000.

Advantageously the compositions contain an accelerator for the reaction between the polyene and the polymercaptan, and preferably this accelerator is an organic or inorganic Brønsted base or acid, or a free-radical catalyst. The last are of general applicability and include organic or inorganic peroxides and persalts such as benzoyl peroxide, hydrogen peroxide, tert.butyl hydroperoxide, di-isopropyl peroxydicarbonate, and ammonium persulphate. For polyenes which do not contain ethylenic double bonds $\alpha$ to carbonyloxy groups Brønsted acids may also be used. Examples of suitable such acids are sulphuric, phosphoric, and hydrochloric acids, also aromatic sulphonic acids such as toluene-p-sulphonic acid. For the preferred polyenes, i.e., those having ethylenic double bonds $\alpha$ to carbonyloxy groups, Brønsted bases may be used. Examples of suitable bases are primary, secondary, and tertiary amines, such as triethylamine, N,N-dimethylaniline, and N-benzyldimethylamine, lower alkanolamines (e.g., mono-, di-, and tri-ethanolamine), lower alkylene polyamines (e.g., ethylenediamine, diethylenetriamine, triethylenetetramine, tetraethylenepentamine, propane-1,2-diamine, propane-1,3-diamine, and hexamethylenediamine), also quaternary ammonium bases such as tetramethylammonium hydroxide, and water-soluble inorganic hydroxides (especially sodium hydroxide) and inorganic salts such as trisodium phosphate, sodium carbonate, sodium bicarbonate, sodium pyrophosphate, and sodium acetate.

Compositions employed in the method of this invention may be cured, i.e., converted into an insoluble, infusible solid, without the application of heat, but, if desired, curing may be accelerated by heating them to a temperature of at least 60°, but preferably not more than 180°C: for most purposes, a temperature in the range 80° to 130°C is particularly convenient. If wished, the composition may be cured in two stages: first, it is heated sufficiently for it to gel but not to cure, and, if desired, a decorative pattern is imprinted on the leather, e.g., by passing it through cold, embossed rollers, and curing is then completed by further heating.

The compositions may contain fillers and thickening agents such as calcium carbonate, silica flour, barytes, kaolin, and finely-divided polymers such as cured urea-formaldehyde resins. They may also contain pigments. Particularly if the polyene and/or the polymercaptan has a poly(oxyalkylene) chain the compositions may also contain substances which stabilise the cured product against adverse effects of light. Suitable stabilisers include compounds having at least one phenolic hydroxyl group and at least one alkyl or alkoxy group of 1 to 8 carbon atoms in the same benzene ring, especially compounds having 1 to 4 benzene rings, at least one of which bears a phenolic hydroxyl group ortho to such an alkyl or alkoxy group. Specific examples of suitable stabilisers include 1,1-bis(3,5-di-tert.butyl-2-hydroxyphenyl)butane, 1,1-bis(3-tert.butyl-2-hydroxyphenyl)butane, 1,1-bis(2-tert.butyl-4-hydroxy-6-methylphenyl)butane, bis(3-tert.butyl-2-hydroxy-5-ethylphenyl)methane, bis(3-tert.butyl-4-hydroxy-6-methylphenyl) sulphide, octadecyl 3-(3,5-di-tert.butyl-4-hydroxyphenyl)propionate, pentaerythrity 1 tetrakis(3-(3,5-di-tert.butyl-4-hydroxyphenyl)propionate), and the nickel complex of formula

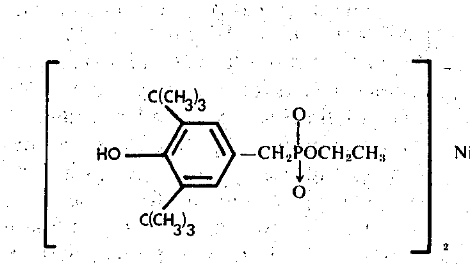

XXIV

Usually, about 0.1 to 5% by weight of the stabiliser, calculated on the weight of the poly(oxyalkylene)-containing polymercaptan and/or polyene, is employed.

The composition may also contain fluorescent brightening agents, absorbers of ultra-violet light, and antimicrobial agents.

The polyene and polymercaptan are usually applied in the liquid state, if need be from solution in a volatile organic solvent (such as trichloroethylene, acetone, ethyl methyl ketone, toluene, or ethyl acetate) or from an aqueos suspension or emulsion. Aqueous suspensions or emulsions can be obtained by vigorously stirring with water in the presence of a surfactant such as an adduct of 1 mol. of p-nonylphenol with 9 mol. of ethylene oxide or of 1 mol. of mixed n-alkylamines containing 16 or 18 carbon atoms with 70 mol. of ethylene oxide: with polyenes containing free carboxyl groups, these may be suspended in water containing the requisite amount of an alkali for neutralisation of the carboxyl groups. Usually, from 1 to 20 parts of the combined weight of the polyene and the polymercaptan are used per 100 parts by weight of leather. The compositions may be applied by roller-coating, knife-coating, casting, swabbing or brushing; where the leather has a grain side, it is preferably applied to that side rather than to, or as well as, the flesh side.

The following Examples illustrate the invention. Parts are by weight and temperatures are given in degrees Celsius. "Polyol I" is a polyoxypropylenetriol (a glycerol-propylene oxide adduct) of average molecular weight 700. Polyols II, III, IV, and V are similar, but have average molecular weights of 4000, 480, 600, and 1500, respectively.

Polythiol A denotes pentaerythritol tetrathioglycollate

Polythiol B denotes the trithioglycollate of Polyol I: Polythiol B is of the formula

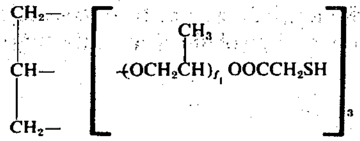

XXV where $f_1$ is an integer of average value 3.5.

Polythiol C denotes a polysulphide which is essentially of the average formula $$HS\text{-}(C_2H_4OCH_2OC_2H_4SS)_{23}\,C_2H_4OCH_2OC_2H_4SH \qquad XXVI$$

polythiol D denotes the tris 2-hydroxy-3-mercaptopropyl) ether of Polyol III: it is essentially of the formula

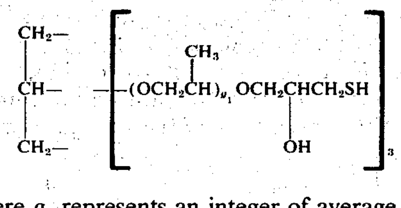

XXVII where $g_1$ represents an integer of average value 2.2.

Polythiol E is the trithioglycollate of Polyol II: it is of formula XXV, where $f_1$ is an integer of average value 22.5.

Polythiol F is the trithioglycollate of Polyol IV: it is of formula XXV, where $f_1$ is an integer of average value 2.9.

Polythiol G is a mercaptan-terminated polyester, made by heating to reflux glycerol (1 mol.), adipic acid (4 mol.), butane-1,4-diol (4 mol.), and thioglycollic acid (3 mol.) in perchloroethylene with stirring for 5 hours under nitrogen, in the presence of toluene-p-sulphonic acid as catalyst, water formed during the reaction being removed as its azeotrope. The mixture was washed with water until the washings had a pH of 5 to 6, then the perchloroethylene was distilled off under reduced pressure.

Polythiol H, also a mercaptan-terminated polyester, was made similarly, from 1 mol. of 1,1,1-trimethylolpropane, 2 mol. of adipic acid, 2 mol. of polyoxypropylene glycol of average molecular weight 425, and 3 mol. of 3-mercaptopropionic acid.

Polythiol J is 1,1,1-trimethylolpropane trithioglycollate.

Polythiol K is 1,2-bis(2-mercaptoethoxyethane).

Polyolefin A is the tris(3-methacryloxy-2-hydroxy-n-propyl) ether of Polyol I, and as prepared as follows:

The triglycidyl ether (500 g) of Polyol I (having an epoxide content of 2.7 equiv./kg), methacrylic acid (116 g), triethylamine (6 g), and hydroquinone (0.5 g) were stirred together at 80° for 2 hours and then at 120° for 3 hours, by which time the epoxide content of the product had fallen to zero.

Polyolefin A is substantially of the formula

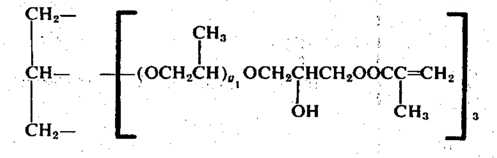

XXVIII were $g_1$ is an integer of average value 3.5.

Polyolefin B denotes the tris(3-carboxyacrylate) of Polyol II, and it was made in this way:

A mixture of Polyol II (200 g), 14.7 g of maleic anhydride, and 2 g of N-benzyldimethylamine was stirred at 120° for 100 minutes. The product, Polyolefin B, is substantially of the formula

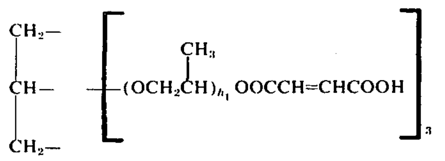

XXIX where $h_1$ is an integer of average value 22.5.

Polyolefin C, which is substantially the 3-n-butoxy-2-hydroxypropyl ester of Polyolefin B, was made by adding, while stirring, 49 g (0.9 /molar proportion) of n-butyl glycidyl ether (epoxide content 7.1 equiv./kg) to 536.5 g of Polyolefin B heated at 120°, and stirring was continued for 1 hour 40 minutes at 120°, by which time the cxpoxide content of the product was zero.

Polyolefin C is substantially of the average formula

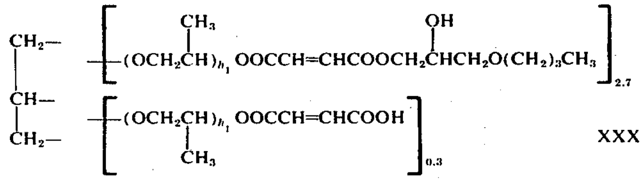

XXX where each $h_1$ has the meaning assigned in formula XXIX:

Polyolefin D was prepared by adding the triglycidyl ether (epoxide content 0.58 equiv./kg) of Polyol II (200 g) dropwise over 1 hour to 8.4 g of acrylic acid, containing 1% of triethylamine and 0.1% of hydroquinone, stirred at 120°, and continuing to heat at 120° with stirring until the epoxide content of the product had fallen to a negligibly low value. Polyolefin D is of formula XXXI where $j_1$ denotes an integer of average value 22.5.

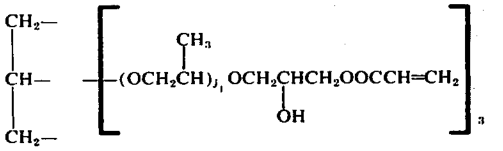

XXXI

Polyolefin E was prepared by heating under nitrogen 500 g of a poly(oxypropylene) glycol of average molecular weight 2000 with 49 g of maleic anhydride at 80° for 45 minutes and then for 1 hour at 120° in the presence of 5 g of N-benzyldimethylamine: to the product was added n-butyl glycidyl ether of epoxide content 7.05 equiv./kg (71 g) and the mixture was heated under an atmosphere of nitrogen for 1¼ hours at 120°. Polyolefin E is substantially of the formula

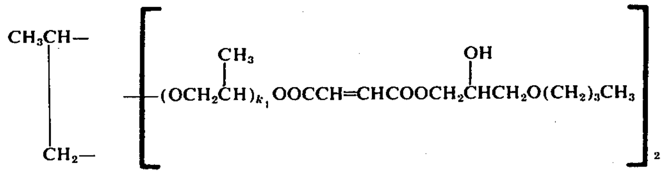

XXXII where $k_1$ denotes an integer of average value 16.6

Polyolefin F was obtained by heating 3 kg of Polyol V, maleic anhydride (588 g), and triethylamine (25 g) for 2 hours at 80°. It was an amber liquid, containing 1.72 ethylenic double bond equiv. per kg: it is substantially of formula XXIX, where $h_1$ denotes an integer of average value 8.1

Polyolefin G was prepared in a similar manner, employing 1.2 kg of Polyol IV in place of the 3 kg of Polyol V: it is substantially of formula XXIX, where $h_1$ denotes an integer of average value 2.9.

Polyolefin H was prepared by adding freshly distilled acrylyl chloride (20 g) to a stirred solution of Polyol II (200 g) and triethylamine (22 g) in 200 g of dry acetone, stirring the mixture for 1 hour at room temperature, and then heating to reflux for 5 hours. The product was filtered, 0.2 g of p-methoxyphenol was added to inhibit polymerisation, and the acetone was evaporated off under reduced pressure. Polyolefin H is substantially of the formula

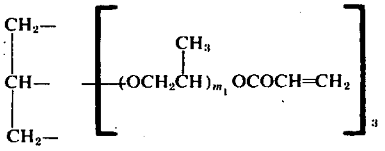

XXXIII where $m_1$ denotes an integer of average value 22.5.

Polyolefin J was made by stirring 500 g of the triglycidyl ether of Polyol I (epoxide content 2.7 equiv./kg), acrylic acid (97 g), triethylamine (6 g), and hydroquinone (0.5 g) at 80° for 2 hours and then at 120° for 3 hours, at which time the epoxide content of the mixture had fallen to zero.

The product, Polyolefin J, is substantially of the formula XXXI, where $j_1$ is an integer of average value 3.5.

Polyolefin K was prepared by mixing 384 g of the diglycidyl ether of 2,2-bis(p-hydroxyphenyl)propane, of epoxide content 5.2 equiv./kg, with 144 g of acrylic acid in the presence of N-benzyldimethylamine (5.3 g) and p-methoxyphenol (0.53 g), and heating to 120° for 2 hours. The product, Polyolefin K, is of the formula

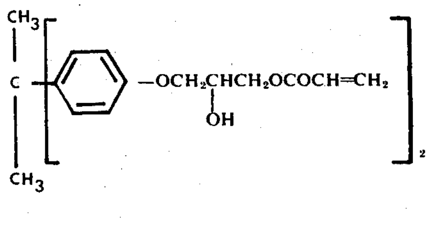

XXXIV

EXAMPLE I

Compositions were made by mixing together the components listed, the figures denoting parts.

| | a | b | c | d | e |
|---|---|---|---|---|---|
| Polyolefin A | 3 | 3 | — | — | 3 |
| Polyolefin B | — | — | 5 | 5 | — |
| Polythiol A | 1 | 1 | — | — | — |
| Polythiol B | — | — | 1 | 1 | 2 |
| triethylamine | 0.1 | 0.1 | — | — | 0.05 |
| trichloroethylene | — | — | — | — | 0.45 |
| silica* | — | 0.2 | — | 0.3 | — |

*A silica of high specific surface area was used.

They were spread onto pieces of chrome-tanned leather (1 mm thick) and left to cure overnight at room temperature under weighted glass plates. Very glossy, smooth coatings were produced in all cases, the treated leather being resilient and of attractive appearance.

EXAMPLE II

Cowhide which had been tanned by a synthetic tanning-chrome tanning process was sprayed evenly on the grain side to a 10% uptake (wet weight) with a composition comprising 1000 parts of a 40% aqueous emulsion of Polythiol E, 800 parts of a 40% aqueous emulsion of Polyolefin B, and 20 parts of a dyestuff (CIBALAN Red 2 GL). The leather was dried for 3 hours at 60°, a colour-fast, abrasion-resistant coating being obtained with a soft finish. In place of the CIBALAN Red 2GL, other anionic or nonionic dyestuffs could be used.

EXAMPLE III

In place of the compositions used in Example I the following compositions shown in Tables I and II could be used:

TABLE I

| | f | g | h | i | j | k | l | m | n |
|---|---|---|---|---|---|---|---|---|---|
| Polyolefin A | 10 | — | — | — | — | — | 25 | — | — |
| Polyolefin B | — | — | — | — | — | — | — | — | 53 |
| Polyolefin C | — | 180 | — | — | — | — | — | 27 | — |
| Polyolefin D | — | — | 40 | — | — | — | — | — | — |
| Polyolefin E | — | — | — | 36 | — | — | — | — | — |
| Polyolefin F | — | — | — | — | 36 | — | — | — | — |
| Polyolefin G | — | — | — | — | — | 10 | — | — | — |
| Polythiol A | — | — | — | — | 6 | — | — | — | 4 |
| Polythiol C | 40 | — | — | — | — | 40 | — | — | — |
| Polythiol D | — | — | 8 | 12 | — | — | — | — | — |
| Polythiol E | — | 200 | — | — | — | — | — | — | — |
| Polythiol F | — | — | — | — | — | — | 25 | 25 | — |
| Triethylamine | — | 2 | — | — | — | — | — | — | — |
| Diethylenetriamine | 0.5 | — | 0.5 | 0.5 | 0.5 | 0.5 | 0.5 | 0.5 | 0.5 |

TABLE II

| | o | p | q | r | s | t | u | v | w |
|---|---|---|---|---|---|---|---|---|---|
| Polyolefin B | 53 | 50 | — | — | — | — | — | 31.2 | — |
| Polyolefin F | — | — | — | — | — | — | — | — | 33 |
| Polyolefin G | — | — | 20 | 20 | — | — | — | — | — |
| Polyolefin H | — | — | — | — | 25 | — | — | — | — |
| Polyolefin J | — | — | — | — | — | 10 | — | — | — |
| Polyolefin K | — | — | — | — | — | — | 15 | — | — |
| Polythiol A | 4 | — | — | — | — | — | — | — | — |
| Polythiol E | — | — | — | — | 25 | 33 | — | — | — |
| Polythiol F | — | — | — | — | — | — | 33.7 | — | — |
| Polythiol G | — | — | 26.4 | — | — | — | — | — | — |
| Polythiol H | — | — | — | 35 | — | — | — | — | — |
| Polythiol J | — | 5 | — | — | — | — | — | — | — |
| Polythiol K | — | — | — | — | — | — | — | 2 | 5 |
| Diethylenetriamine | — | — | 0.5 | 0.5 | 0.5 | 0.5 | 0.5 | 0.5 | 0.5 |

We claim:

1. A process for providing leather with a wearing or decorative surface which consists of 1. coating 100 parts by weight of the leather on at least one face with 1 to 20 parts by weight of a curable composition comprising
   i. a polymercaptan containing, per average molecule, at least two and at most six mercaptan groups and having an average molecular weight of at least 182 and at most 10,000
   ii. A polyene having an average molecular weight of at least 250 and at most 10,000, and containing, per average molecule, at least two ethylenic double bonds each $\alpha$ to a carbonyloxy group, the sum of the mercaptan groups in said polymercaptan and of such ethylenic double bonds in said polyene being more than 4 but at most 8, said polymercaptan being in a quantity sufficient to supply from 0.8 to 1.1 mercaptan groups per said ethylenic double bond of the polyene, and
2. curing the compositon on the leather.

2. Process according to claim 1, in which at least one of the polyene and the polymercaptan has an average molecular weight of at least 1000 and at most 6000.

3. Process according to claim 1, in which the polymercaptan is an ester of a monomercaptancarboxylic acid with a polyhydric alcohol or of a monomercaptanmonohydric alcohol with a polycarboxylic acid.

4. Process according to claim 3, in which the polymercaptan is of the formula

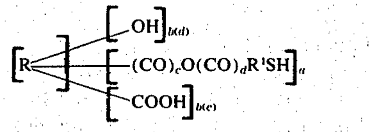

where

R represents an aliphatic or araliphatic hydrocarbon radical of at least 2 and at most 60 carbon atoms or an aliphatic or araliphatic hydrocarbon radical of at least 2 and at most 60 carbon atoms containing one ether oxygen atom, $R^1$ represents a hydrocarbon radical of 1 to 4 carbon atoms or a hydrocarbon radical of 1 to 4 carbon atoms containing one carbonyloxy group, $a$ is an integer of from 2 to 6, $b$ is zero or a positive integer of at most 3, such that (a + b) is at most 6, and $c$ and $d$ each represent zero or 1, but are not the same.

5. Process according to claim 4, in which the polymercaptan is also of the formula $$R^2(OCOR^3SH)_a$$

where $a$ has the meaning assigned in claim 4, $R^2$ is an aliphatic hydrocarbon radical of from 2 to 10 carbon atoms, and $R^3$ denotes $-CH_2-$, $-(CH_2)_2-$, or $CH_3$
$-CH-.$

6. Process according to claim 3, in which the polymercaptan is a polyester of formula $$R^6\{(O)_g CO(O)_h R^4(O)_h CO(O)_g R^5SH\}_f$$

where

*f* is an integer of from 1 to 6,

*g* and *h* are each zero or 1 but are not the same, $R^4$ represents a divalent organic radical, linked through a carbon atom or carbon atoms thereof to the indicated —O— or —CO— units, $R^5$ represents a divalent organic radical, linked through a carbon atom or carbon atoms thereof to the indicated —SH group and —O— or —CO— units, and $R^6$ represents an organic radical, which must contain at least one —SH group when *f* is 1, linked through a carbon atom or carbon atoms thereof to the indicated —O— or —CO— units.

7. Process according to claim 1, in which the polymercaptan is an ether or an ester of the general formula $$R^7 \begin{cases} [(O\text{-alkylene})_jOH]_m \\ [(O\text{-alkylene})_jO(CO)_kR^8]_n \end{cases}$$

where each alkylene group contains a chain of at least 2 and at most 6, carbon atoms between consecutive oxygen atoms,

*j* is a positive integer such that the average molecular weight of the polymercaptan is at least 400 and at most 10000,

*k* is zero or 1,

*m* is zero or a positive integer such that $(m+n)$ is at most 6

*n* is an integer of from 2 to 6, $R^7$ represents the radical of a polyhydric alcohol after removal of $(m+n)$ alcoholic hydroxyl groups, and $R^8$ represents an aliphatic radical containing at least one mercaptan group.

8. Process according to claim 7, in which the polymercaptan is of the formula $$R^9 \begin{cases} [(O\text{-alkylene})_jOH]_m \\ [(O\text{-alkylene})_jOCOC_pH_{2p}SH]_n \end{cases}$$

or $$R^9 \begin{cases} [(O\text{-alkylene})_jOH]_m \\ [(O\text{-alkylene})_jOCH_2\underset{\displaystyle OH}{\underset{|}{C}}HCH_2SH]_n \end{cases}$$

where alkylene, *j*, *m*, and *n* have the meanings assigned in claim 8, $R^9$ represents an aliphatic hydrocarbon radical of from 2 to 6 carbon atoms, and

*p* is 1 to 2.

9. Process according to claim 1, in which the polymercaptan is of the formula $$HS-[R^{10}(O)_q(\underset{\displaystyle R^{11}}{\underset{|}{C}}HO)_rR^{10}_tSS]_u-R^{10}(O)_q(\underset{\displaystyle R^{11}}{\underset{|}{C}}HO)_rR^{10}_tSH$$

where $R^{10}$ denotes an alkylene hydrocarbon group containing from 2 to 4 carbon atoms, $R^{11}$ denotes —H, $—CH_3$, or $—C_2H_5$,

*u* is an integer which has an average value of at least 1, such that the average molecular weight of the polymercaptan is at most 10000, and either *q* is zero, in which case *r* and *t* are each also zero, or *q* is 1, in which case *r* is zero or 1 and *t* is 1.

10. Process according to claim 1, in which the polymercaptan is a mercaptan-terminated poly(butadiene) of the formula

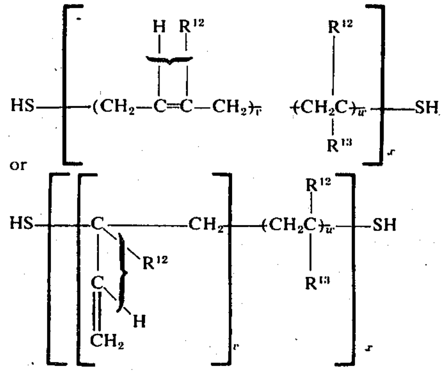

where each $R^{12}$ represents —H or $—CH_3$, $R^{13}$ represents —CN, —COOH, $—CONH_2$, $—COOR^{14}$, $—C_6H_5$, or $—OCOR^{14}$, where $R^{14}$ is an alkyl group of one to eight carbon atoms,

*v* is an integer of at least one,

*w* is zero or a positive integer, and

*x* is an integer such that the average number molecular weight of the polymercaptan is at least 500 and at most 10000.

11. Process accordng to claim 1, in which the polymercaptan is of the formula $$HS(CH_2\overset{\displaystyle R^{12}}{\overset{|}{C}}HO)_eCH_2\overset{\displaystyle R^{12}}{\overset{|}{C}}HSH$$

where each $R^{12}$ represents —H or $—CH_3$, and

*e* is an integer of 1 to 4.

12. Process according to claim 1, in which the polyene is of the formula $$R^{15}[(O\text{-alkylene})_{d_1}—O—(CH_2\underset{\displaystyle R^{16}}{\underset{|}{C}}HCH_2O)_{e_1}—R^{17}]_{c_1}$$

where $d_1$ is zero or a positive integer of value such that the average molecular weight of the polyene does not exceed 10000, $e_1$ is zero or 1, $c_1$ is an integer of at least 1 and at most 6, $R^{15}$ denotes a radical of 3 to 60 carbon atoms remaining after removal of $c_1$ OH groups for a compound having at least $c_1$ alcoholic or phenolic hydroxyl groups or the acyl radical remaining after removal of $c_1$ OH groups from a compound having at least $c_1$ COOH groups, each alkylene group contains a chain of at least 2 and at most 6 carbon atoms between consecutive oxygen atoms, $R^{16}$ represents a group of formula —OH or $—OOCR^{18}$, where $R^{18}$ represents —H, or a monovalent hydrocarbon group or a monovalent hydrocarbon group bearing carboxyl or alkoxycarbonyl substituents, and $R^{17}$ represents —H, an acyl group, or the residue, after removal of an —OH group, of an alcohol, with the provisos that $R^{15}$ and $R^{17}$ do not both represent acyl when $d_1$ and $e_1$ both denote zero and that $R^{17}$ does not represent —H when $e_1$ is 1, there being a total of at least two ehtylenic double bonds $\alpha$ to carbonyloxy groups in the said polyene.

13. Process according to claim 1, in which the composition contains a Bronsted base as accelerator.

14. Process according to claim 1, in which the composition contains a Brønsted acid or a free-radical catalyst as accelerator.

15. Leather bearing thereon a wearing or decorative surface which is a cured compositon comprising i. a polymercaptan containing, per average molecule, at least two and at most six mercaptan groups and having an average molecular weight of at least 182 and at most 10,000, and ii. a polyene having an average molecular weight of at least 250 and at most 10000 and containing, per average molecule, at least two ethylenic double bonds each $\alpha$ to a carbonyloxy group, the sum of the mercaptan groups in said polymercaptan and of the ethylenic double bonds in said polyene being more than 4 but at most 8.

* * * * *

UNITED STATES PATENT AND TRADEMARK OFFICE
CERTIFICATE OF CORRECTION

PATENT NO. : 3,968,312

DATED : July 6, 1976

INVENTOR(S) : HEINZ ABEL ET AL

It is certified that error appears in the above-identified patent and that said Letters Patent are hereby corrected as shown below:

Column 14, claim 1, line 22, delete "compositon" and insert --- composition ---.

Column 15, claim 8, line 54, delete "8" and insert --- 7 ---.

Column 15, claim 8, line 57, delete "to" and insert --- or --

Column 16, claim 12, line 60, delete "for" and insert --- from ---.

Column 17, claim 12, line 10, delete "ehtylenic" and insert --- ethylenic ---.

Signed and Sealed this

Twenty-sixth Day of October 1976

[SEAL]

*Attest:*

RUTH C. MASON
*Attesting Officer*

C. MARSHALL DANN
*Commissioner of Patents and Trademarks*